United States Patent [19]

Smith

[11] 4,004,948
[45] Jan. 25, 1977

[54] PAINT-ON THERMOCOUPLE

[75] Inventor: Warren K. Smith, Poway, Calif.

[73] Assignee: The United States of America as represented by the Secretary of the Navy, Washington, D.C.

[22] Filed: May 29, 1975

[21] Appl. No.: 582,044

[52] U.S. Cl. .............................. 136/201; 136/241; 427/123; 427/125
[51] Int. Cl.² ........................................ H01L 35/12
[58] Field of Search ........... 102/105; 136/201, 241; 427/96, 123, 125; 428/901

[56] References Cited
UNITED STATES PATENTS

| | | | |
|---|---|---|---|
| 3,729,343 | 4/1973 | Thomas | 136/201 |
| 3,750,243 | 8/1973 | Prentice | 427/123 |
| 3,779,878 | 12/1973 | Swift et al. | 427/125 X |

*Primary Examiner* — Leland A. Sebastian
*Attorney, Agent, or Firm* — R. S. Sciascia; Roy Miller; Gerald F. Baker

[57] ABSTRACT

Thermocouples are fabricated by painting lines of two dissimilar thermal-element materials on a non-conducting substrate such that the painted lines intersect at the location where temperature is to be measured. Alternatively the paint may be thinned to the consistancy of ink and used in a printing process. Thermocouples may be thus formed on paper, cloth or plastic surfaces, for example.

7 Claims, 1 Drawing Figure

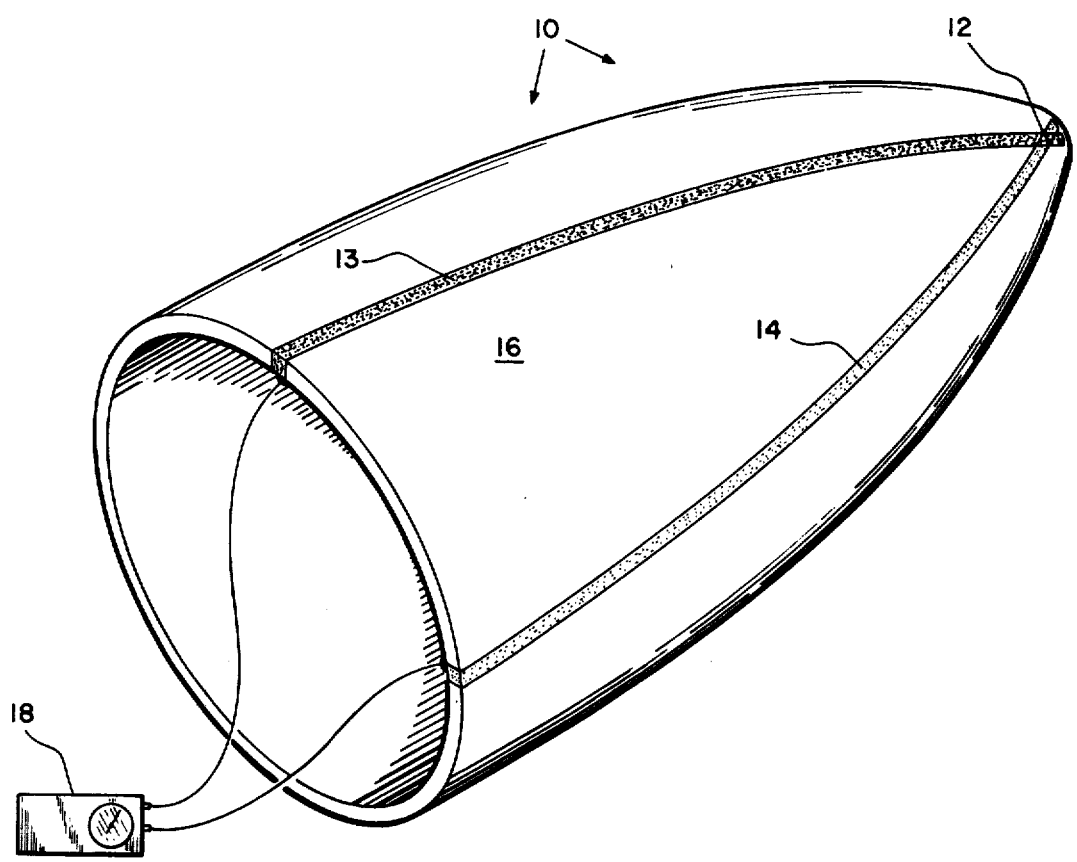

PAINT-ON THERMOCOUPLE

BACKGROUND OF THE INVENTION

The present invention relates to thermocouples and particularly to thermocouples which may be painted or printed on relatively delicate substrates. The application of thin films to refractory materials to form thermocouples has been described in U.S. Pat. No. 3,099,575 issued to J. S. Hill. Thin adherent films of electrically dissimilar metals were spread on a refractory support and heat treated at high temperatures to completely sinter the films and bond them to the support.

SUMMARY

The present invention relates to methods and materials for forming thermocouples on relatively delicate substrates which would not survive the sintering process of Hill. According to the present invention, therefore, the testing of missile seeker domes, aircraft wings, etc. may be accomplished by simply painting on the dissimilar materials such that the lines overlap at one point and the free ends are connected with extension lead wires, if necessary, to cold junctions and to a meter or recorder.

BRIEF DESCRIPTION OF THE DRAWING

The single FIGURE of the drawing is an isometric view depicting a test hook-up used in a practical application of the invention for the measurement of temperature on a missile.

DESCRIPTION AND OPERATION

The practice of the invention requires the production of conductive paints of the various thermo-elements and such may be accomplished in accordance with established processes of manufacturing conducting silver or copper paints, for example, for the printed circuitry trade using due care to avoid oxidation of the metal particles by exposure to air in the case of certain metals. The metal in the paints, for example, may either be finely divided powder or thin flakes such as are produced in some chemical precipitates.

The powders are stirred into a solution of about 1½ to 3% nitro-cotton in butyl-acetate. This can be further thinned with toluol for consistency and more rapid drying if desired.

To form thermocouples on surfaces, a ruling pen or small brush is used to apply lines of the two selected thermo-element paints such that they overlap at the location where temperature is to be measured.

These lines are then extended to a convenient location where thermocouple extension conductors can be attached to connect the cold junctions and instrumentation. Of course, the surfaces on which the thermo-element paints are coated must be non-conductive. If it is desired to put a thermocouple according to the present invention on a metallic surface, therefore, it will be necessary to first coat the metal with a non-conductive material.

The process according to the present invention also lends itself to the printing of thermocouples on surfaces merely by thinning the thermo-element paint to the consistancy of ink for use in a printing press. The process also lends itself to the manufacture of painted on, printed-on, or drawn-on strain gauges by drawing or ruling a line or pattern of lines of constantan paint or ink, for example, and then drawing lead lines of silver flake paint from each end. Readings may be derived from this arrangement depending on change of metal flake-to-flake contact resistance with strain in the base material.

A thermocouple 10 having a hot junction 12 was prepared by painting two lines 13, 14 respectively, of constantan and silver on a plastic substrate in the form of a missile nose cone 16 as shown in FIG. 1 and was subjected to a radiant heating test. For this test the surface of cone 16 was blackened and temperatures were read simultaneously with an infrared pyrometer 18 not sensitive to the wavelengths of the radiant heating energy. The emf generated by the painted-on thermocouple corresponded to that given for a conventional thermocouple of these materials in a handbook of thermal emf vs. temperature.

The silver paint used in the proof of this invention was purchased from a commercial source.

Other thermocouple alloys such as the commonly used chromel-alumel or platinum-rhodium types can also be made to work as paints or inks.

In a similar manner, a paint-on thermister may be attached to a non-conducting substrate using a powdered metal oxide such as magnetite ($Fe_3O_4$) or a mixture of metal oxides suspended in the same type of organic binder in a finite thin narrow strip with the ends connected to instruments by means of silver paint leads, for example.

What is claimed is:

1. The method of making a thermocouple on a surface to be tested comprising:
    mixing two electrically dissimilar metals in finely divided form each with a liquid vehicle and a liquid dryer to obtain two fluid mixtures each having a desired fluid consistency;
    applying a narrow film of each mixture so obtained on said surface along diverging lines intersecting in a relatively small area and terminating at two accessible points remote from said area; and
    drying said lines of narrow film at ambient temperature.

2. The method of claim 1 wherein one mixture comprises the metal alloy constantan.

3. The method of claim 2 wherein the other mixture comprises metallic silver.

4. The method of claim 3 wherein said one mixture further comprises 1½ to 3% nitro-cotton in butyl-acetate and said mixture being thinned to the desired consistency with a toluol dryer.

5. The method of claim 2 wherein the vehicle of said one mixture comprises nitro-cotton in butyl-acetate.

6. The method of claim 1 wherein said supporting surface is conductive and a non-conductive coating is applied to said surface before application of said diverging lines of paint.

7. A thermocouple comprising:
    a non-conductive substrate;
    a first thin narrow strip of metallic film on said substrate; and
    a thin narrow strip of a second, dissimilar, metallic film intersecting and electrically contacting said first strip;
    said first metallic film being a paint containing a finely divided metal selected from the group consisting of: silver, platinum, gold and lead; and
    said second strip being a paint having a pigment consisting essentially of constantan.

* * * * *